(12) United States Patent
Elsner et al.

(10) Patent No.: US 6,551,538 B1
(45) Date of Patent: Apr. 22, 2003

(54) VACUOLE-FREE POLYMER GRANULATES

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/647,227

(22) PCT Filed: Mar. 26, 1999

(86) PCT No.: PCT/EP99/02088

§ 371 (c)(1),
(2), (4) Date: Sep. 27, 2000

(87) PCT Pub. No.: WO99/52967

PCT Pub. Date: Oct. 21, 1999

(30) Foreign Application Priority Data

Apr. 8, 1998 (DE) .......................................... 198 15 717

(51) Int. Cl.$^7$ .............................................. B29C 47/00
(52) U.S. Cl. .................................... 264/141; 264/178 R
(58) Field of Search ................................. 264/141, 142, 264/143, 178 R, 237, 348

(56) References Cited

U.S. PATENT DOCUMENTS

| | | | | |
|---|---|---|---|---|
| 4,699,745 A | * | 10/1987 | Fritsch et al. | ................ 264/143 |
| 5,187,256 A | * | 2/1993 | Kirk | ............................ 528/196 |
| 5,846,607 A | * | 12/1998 | Hurley et al. | ............. 427/374.2 |

FOREIGN PATENT DOCUMENTS

| WO | WO 96/26241 | * | 8/1996 |
|---|---|---|---|

\* cited by examiner

Primary Examiner—Mark Eashoo
(74) Attorney, Agent, or Firm—Joseph C. Gil; John E. Mrozinski; James R. Franks

(57) ABSTRACT

A process for preparing a vacuole-free polymer is disclosed. Extruded polymer resin is cooled at a rate of less than 50° C./sec. to a temperature that is 1 to 20° C. above the glass transition temperature of the polymer resin and the resin is then cut.

9 Claims, No Drawings

VACUOLE-FREE POLYMER GRANULATES

The present Application relates to a process for producing vacuole-free polymer granules wherein, after having been extruded and before being cut, the polymer is cooled at $\leq 50°$ C./sec to just above the glass transition temperature.

The extrusion of the polymer into a specific, in most cases cylindrical, shape is one of the final processing steps in the production of polymers. After the extrusion, the product is then cooled, cut and, if necessary, cooled once more before it is in the form of a saleable product.

One of the requirements placed on this end product is that it should contain no vacuoles, i.e. small gas bubbles, because these have an adverse effect during subsequent processing. Moreover, transparent polymer granules containing vacuoles are visually less appealing.

WO 96/26241 discloses a process for producing polymer granules wherein the strand of polymer, after having been extruded in a water bath at a temperature of between 44° C. and 95° C., is cooled and then cut. The resulting granules contain less than 10 vol. % of vacuoles. However, this value is still not satisfactory.

A process has now been found whereby vacuole-free granules, i.e. granules having a vacuole content of <1 vol. %, preferably even <0.1 vol. %, can be obtained.

The invention provides a process for producing vacuole-free polymer granules wherein, after having been extruded, the polymer is cooled at a cooling rate of <50° C./sec, preferably <20° C., to a temperature which is 1° C. to 20° C., preferably 5° C. to 10° C., above the glass transition temperature $T_g$ of the polymer, and then cut. In a preferred embodiment of the invention, during the cutting process the granular material is cooled to a temperature of $\leq 100°$ C., preferably $\leq 90°$ C. This can be effected, for example, by spraying with water which is at a temperature of $\leq 30°$ C.

The temperature difference between polymer and cooling medium is preferably less than 370° C. In a preferred embodiment, the polymer is cooled with water which is at a temperature of 40° C. to 80° C., preferably 50° C. to 60° C. Particularly preferably, after having been extruded, the polymer is passed through a water bath at a temperature of 40° C. to 80° C., preferably 50° C. to 60° C. The residence time of the polymer in the water bath should preferably be 3 to 10 seconds. In an alternative embodiment, the strand of polymer is sprayed with water after the extrusion process, the water being at a temperature of 40° C. to 80° C., preferably 50° C. to 60° C.

The process according to the invention is suitable for the production of vacuole-free polymer granules of any kind. It is particularly suitable, however, for producing granules of thermoplastic polymers. For the purpose of the invention, thermoplastic polymers include all plastics which become flowable under the effects of pressure and temperature. Examples which may be given here are polystyrene, polyphenylene, polyurethane, polyamide, polyester, polyacrylate, polymethacrylate, SAN and its copolymers. The process is most particularly suitable for producing vacuole-free polycarbonate granules.

For the purpose of the present invention, polycarbonates may be either homopoly-carbonates or copolycarbonates. The polycarbonates may be linear or branched in the known manner. Up to 80 mol. %, preferably from 20 mol. % up to 50 mol. %, of the carbonate groups in the suitable polycarbonates can be replaced by aromatic dicarboxylic ester groups. Such polycarbonates, which contain both acidic groups of carbonic acid and acidic groups of aromatic dicarboxylic acids incorporated into the molecular chain, are, accurately described, aromatic polyester carbonates. They are included under the general heading of thermoplastic, aromatic polycarbonates.

Detailed information about the production of polycarbonates has been set down in hundreds of patent specifications over approximately the last 40 years. By way of example, reference is made here only to: Schnell, "Chemistry and Physics of Polycarbonates", Polymer Reviews, Volume 9, Interscience Publishers, New York, London, Sydney 1964, to D.C. PREVORSEK, B.T. DEBONA and Y. KESTEN, Corporate Research Center, Allied Chemical Corporation, Morristown, N.J. 07960, "Synthesis of Poly (estercarbonate) Copolymers" in Journal of Polymer Science, Polymer Chemistry Edition, Vol. 19, 75–90 (1980), to D. Freitag, U. Grigo, P. R. Müller, N. Nouvertne', BAYER AG, "Polycarbonates" in Encyclopedia of Polymer Science and Engineering, Volume 11, Second Edition, 1988, pages 648–718 and finally, to Dres. U. Grigo, K. Kircher and P. R. Müller "Polycarbonates" in Becker/Braun, Kunststoff-Handbuch, Volume 3/1, Polycarbonate, Polyacetale, Polyester, Celluloseester, Carl-Hanser Verlag, Munich, Vienna, 1992, pages 117–299.

Preferred thermoplastic polycarbonates have average molecular weights $M_v$ (determined by measurement of the relative viscosity at 25° C. in $CH_2Cl_2$ and at a concentration of 0.5 g per 100 ml $CH_2Cl_2$) of 12,000 to 400,000, preferably of 18,000 to 80,000 and in particular of 22,000 to 60,000.

EXAMPLES

Example 1

Polycarbonate was prepared and then extruded to form strands having a cylindrical-ellipsoidal cross-section and a diameter of approximately 3 mm. After extrusion, the temperature of the polycarbonate was 350° C. The strands were cooled in a water bath at a constant water temperature of 60° C. The residence time of the strands in the water bath was 4 seconds. The temperature of the strands on their removal from the water bath was 150° C. The strands were cut/granulated and sprayed with water (T=25° C.) during the cutting process and thus cooled to 95° C.

In the polycarbonate thus produced, the vacuole content was determined by counting the granules containing vacuoles in a 1 kg sample of granular material. No vacuoles were found in the granular material.

Example 2

Polycarbonate was prepared and then extruded to form strands having a cylindrical-ellipsoidal cross-section and a diameter of approximately 3 mm. After extrusion, the temperature of the polycarbonate was 350° C. The strands were cooled in a water bath at a constant water temperature of 60° C. The residence time of the strands in the water bath was 4 seconds. The temperature of the strands on their removal from the water bath was 150° C. The strands were cut without further cooling.

The granular material obtained contained 0.8 vol. % vacuoles.

Example 3 (Comparison)

Polycarbonate was prepared and then extruded to form strands having a cylindrical-ellipsoidal cross-section and a diameter of approximately 3 mm. After extrusion, the temperature of the polycarbonate was 400° C. The strands were cooled in a water bath at a constant water temperature of 20°

C. The residence time of the strands in the water bath was 4 seconds. The temperature of the strands on their removal from the water bath was 95° C. The strands were cut without further cooling.

The polycarbonate granules thus obtained contained 5 vol. % vacuoles.

What is claimed is:

1. Process for producing vacuole-free polymer granules wherein, after having been extruded, the polymer is cooled at a cooling rate of <50° C./sec to a temperature which is 1° C. to 20° C. above the glass transition temperature $T_g$ of the polymer, and then cut.

2. The process according to claim 1, wherein the polymer is cooled to a temperature of ≦100° C. during the cutting.

3. The process according to claim 1, wherein the polymer is polycarbonate.

4. The process according to claim 1, wherein the polymer is selected from the group consisting of polystyrene, polyphenylene, polyurethane, polyamide, polyester, polyacrylate, polymethacrylate, styrene-acrylonitrile (SAN) and copolymers thereof.

5. A process for producing polymer granules comprising:

extruding a thermoplastic polymer; and cooling the extruded polymer at a cooling rate <50° C./sec to a temperature which is 1° C. to 20° C. above the glass transition temperature $T_g$ of the polymer, wherein the polymer granules contain less than 1 percent by volume vacuoles.

6. The process of claim 5 further including cutting the extruded, cooled polymer.

7. The process according to claim 6, wherein the polymer is cooled to a temperature of ≦100° C. during the cutting.

8. The process of claim 5, wherein the polymer is selected from the group consisting of polycarbonate, polystyrene, polyphenylene, polyurethane, polyamide, polyester, polyacrylate, polymethacrylate, styrene-acrylonitrile (SAN) and copolymers thereof.

9. The process of claim 5, wherein the polymer granules contain less than 0.1 percent by volume vacuoles.

* * * * *